United States Patent
Goose

(10) Patent No.: US 12,397,985 B2
(45) Date of Patent: Aug. 26, 2025

(54) OUTER COVER FOR A FLEXIBLE TANK AND OPTIMIZED FLEXIBLE TANK FOR A 40 FOOT SHIPPING CONTAINER WITHOUT A BULKHEAD

(71) Applicant: Odyssey Logistics and Technology Corporation, Danbury, CT (US)

(72) Inventor: Roger G Goose, Horseshoe Bay, TX (US)

(73) Assignee: Odyssey Logistics and Technology Corporation, Danbury, CT (US)

( * ) Notice: Subject to any disclaimer, the term of this patent is extended or adjusted under 35 U.S.C. 154(b) by 105 days.

(21) Appl. No.: 17/717,005

(22) Filed: Apr. 8, 2022

(65) Prior Publication Data
US 2023/0322475 A1  Oct. 12, 2023

(51) Int. Cl.
| | | |
|---|---|---|
| B32B 27/12 | (2006.01) |
| B32B 5/02 | (2006.01) |
| B32B 27/30 | (2006.01) |
| B65D 88/16 | (2006.01) |
| B65D 90/02 | (2019.01) |

(52) U.S. Cl.
CPC .......... B65D 88/1606 (2013.01); B32B 5/024 (2013.01); B32B 27/12 (2013.01); B32B 27/304 (2013.01); B65D 90/022 (2013.01); *B32B 2250/03* (2013.01); *B32B 2250/40* (2013.01); *B32B 2439/46* (2013.01)

(58) Field of Classification Search
CPC .. B65D 88/1606; B65D 90/022; B32B 5/024; B32B 27/12; B32B 27/304; B32B 2250/03; B32B 2250/40; B32B 2439/46
USPC .............................................. 383/44
See application file for complete search history.

(56) References Cited

U.S. PATENT DOCUMENTS

| | | | | |
|---|---|---|---|---|
| 5,188,460 A | * | 2/1993 | Dorse | B65D 90/048 |
| | | | | 383/125 |
| 5,634,721 A | | 6/1997 | Moore | |
| 6,186,713 B1 | * | 2/2001 | Bonerb | B60P 3/426 |
| | | | | 410/97 |
| 6,609,863 B1 | * | 8/2003 | Morioka | B60P 3/426 |
| | | | | 383/61.3 |
| 7,717,296 B1 | * | 5/2010 | Guthrie | B65D 90/00 |
| | | | | 222/105 |
| 8,100,614 B2 | * | 1/2012 | Jerich | B60P 3/426 |
| | | | | 410/2 |
| 10,137,809 B2 | * | 11/2018 | Postek | B60N 3/10 |

(Continued)

FOREIGN PATENT DOCUMENTS

| | | |
|---|---|---|
| CN | 2795101 Y | 7/2006 |
| CN | 1861486 | 11/2006 |

(Continued)

*Primary Examiner* — Peter N Helvey
(74) *Attorney, Agent, or Firm* — Morgan, Lewis & Bockius LLP

(57) ABSTRACT

An exterior cover of a generally rectangular flexible tank for a 40 foot shipping container has longitudinal seams along the long sides of the flexible tank rather than at the ends. The exterior cover is air-tight and contains holes near the ends of the flexible tank. The exterior cover is made of a flexible vinyl material that is optimized for the flexitank. The flexible vinyl material consists of an inner scrim core of woven fibers coated with melted PVC which goes through the holes between the woven fibers.

16 Claims, 5 Drawing Sheets

(56) References Cited

U.S. PATENT DOCUMENTS

| | | | |
|---|---|---|---|
| 10,836,298 B1* | 11/2020 | Bonnar | B65D 90/046 |
| 11,465,832 B2* | 10/2022 | Kohen | B65D 90/006 |
| 2002/0030055 A1 | 3/2002 | Maturana | |
| 2005/0018930 A1 | 1/2005 | McClean | |
| 2005/0170720 A1 | 8/2005 | Christiansen et al. | |
| 2006/0251343 A1 | 11/2006 | True et al. | |
| 2009/0052813 A1 | 2/2009 | Grosse-Heitmeyer et al. | |
| 2012/0087760 A1* | 4/2012 | Sims | B65D 90/047 410/52 |
| 2014/0251989 A1 | 9/2014 | Clive-Smith | |
| 2017/0144833 A1 | 5/2017 | Sims | |
| 2018/0148253 A1 | 5/2018 | Postek et al. | |

FOREIGN PATENT DOCUMENTS

| | | | |
|---|---|---|---|
| CN | 112789229 A | 5/2021 |
| JP | 1159691 A | 3/1999 |
| JP | 5909995 B2 | 4/2016 |
| KR | 101619999 B1 | 5/2016 |

\* cited by examiner

OUTER COVER FOR A FLEXIBLE TANK AND OPTIMIZED FLEXIBLE TANK FOR A 40 FOOT SHIPPING CONTAINER WITHOUT A BULKHEAD

FIELD OF THE INVENTION

The invention relates to flexible tanks for transporting liquids. More particularly, the invention relates to flexible tanks used in 40 foot shipping containers without bulkheads.

BACKGROUND

Flexible tanks for transporting liquids (commonly referred to as "flexitanks") are useful because they enable one to transport bulk liquids within a generic intermodal shipping container so that a shipping container specifically designed for the transport of liquids is not necessary. There are a number of characteristics which are necessary for a flexible tank to be suitable for the transport of bulk liquids. Perhaps the most important characteristic is that the flexible tank has an extremely low rate of failure and can withstand adverse conditions without rupture or leaking. The most common adverse conditions are sudden acceleration or deceleration, such as during railroad shunting or long-haul trucking over congested and/or mountainous roads. Unlike bulk materials in granular, powder or other particulate form, when such conditions are encountered while transporting liquid, the result is often large temporary dynamic forces that put extreme pressure, sometimes repeatedly, on the end seams of the flexitanks. There may also be conditions of general unrest such as a ship on open seas or situations in which the shipping container and the flexible tank within are dropped a short distance to a solid surface in a port or quay. These forces vary according to certain factors, such as the viscosity of the liquid, the conditions and length of the transport, the dimensions and volume of the flexitank, the volume of liquid in the flexitank, and the external support, if any provided to the flexitank by the shipping container.

A flexible tank must also be relatively light weight, inexpensive, easy to install in the shipping container, and easy and quick to fill and discharge. Unlike bags containing bulk solids, which can be lifted and moved into and out of a shipping container by a fork lift, a flexitank for liquids must be placed into a shipping container before it is filled and the liquid must be discharged from the flexitank while the flexitank is still in the container. Increasingly, it is also desired that the flexible tank be renewable or disposable.

Multi-layer flexible tanks have been developed for 20 foot shipping containers having bulkheads placed across the opening at the rear doors. They are generally longer than 20 feet, such as 24 feet, so that their ends are supported by the front wall, and the bulkhead, making particularized features, details and optimization in view of the liquid dynamic forces generally unnecessary. They generally have an inner tank 10 enclosing the liquid placed in an outer cover 20 of woven polypropylene. The inner layer(s) is constructed so as to keep liquid tight without leakage or osmosis various sensitive liquids, including fruit juices, wine, and others whose taste and other characteristics cannot be changed as a result of storage in the inner layer(s). The outer cover does not come into contact with the liquid and provides extra strength so that the inner layer(s) do not burst because of the dynamic forces created by the liquid. It is typically made of woven polypropylene or other synthetic material.

Conventionally, the outer cover of a flexitank is formed from a roll of polyethylene material having a width and a length just slightly greater than the inner bladder or tank. The inner bladder 10 is placed on the ground at one open end of the tube 20 and then dragged in the direction of the arrow in FIG. 1 all the way into tube 20 so that it is contained within the tube. This takes some strength and sometimes, forklifts and ropes, etc., are employed to pull the inner bladder 10 through tube 20. Care must be taken that neither the inner bladder 10 or the outer layer 20 is damaged during the lengthy drag. After the inner bladder 10 is placed inside tube 20, a first end is closed with a first end seam 21 as shown in prior art FIG. 2. The opposite end of tube 20 is then also closed with a second horizontal end seam 22 as shown in prior art FIG. 3. (see also FIGS. 10-15 of True US Patent Application No. 2006/0251343). A typical cross-stitched end seam used for seams 21 and 22 is shown in FIGS. 4(a) and 4(b).

Unfortunately, such flexible tanks are not sufficient for use in larger containers without rear bulkheads or in which the front of the container is likely to cause a rupture if it is used as support for a flexitank. These circumstances are frequently present in larger shipping containers, such as 40 foot or 53 foot containers. The ubiquity of such larger shipping containers in some multimodal transport routes is such that it would be beneficial to have a freestanding flexible tank, unsupported by any wall or bulkhead, that functions as well as the known flexitanks for 20 foot containers. But it has proven difficult to develop such a freestanding flexitank that will not rupture, and will have most, if not all, of the other characteristics desired for modern flexitanks.

The foremost concern with using conventional flexible tanks without container support at the ends is that the flexitank ends cannot withstand the dynamic forces, especially when the liquid in the flexitank moves 40 feet rather than 20 feet. The forces are at the highest at the ends of inner tank 10 and outer cover 20 and end seams 21 and 22 are especially prone to failure. The stitching in cross-stitched end seams is prone to being pulled out and welds may fail under the increased pressure. While the ends may be strengthened or reinforced in various ways, such modifications usually result in undesirable side effects, such as increased cost, weight or complexity to use.

Prior efforts attempted to divide the flexitank into separate sections or compartments to decrease the liquid dynamic forces on the ends. See U.S. Patent Publication No. 2017/0144833 by Environmental Packaging Technologies. But multiple discharge valves increase the time to fill and discharge the liquid. A variety of baffles or other physical barriers within the flexitank have also been suggested to disrupt the flow of the liquid. See, for example, U.S. Patent Application Publication No. 2014/0251989. But these efforts have also proven unsuccessful in one way or another. In particular, they require additional mechanical components that make it more difficult to manufacture, and increase the complexity, cost and weight of the flexible tank.

BRIEF SUMMARY

It is an objective of the preferred embodiments of the invention to provide an improved flexible tank for multimodal shipments of a liquid, when the ends of the outer cover of the flexible tank are not supported by the container, in particular for a 40 foot shipping container. It is another objective of the preferred embodiments to provide an improved method of manufacturing such flexitanks.

DETAILED DESCRIPTION OF THE PREFERRED EMBODIMENTS

A preferred embodiment of a freestanding flexitank 100 for a 40 foot shipping container and a method of manufacturing the same is shown in the accompanying figures. Flexitank 100 consists of a liquid containing inner bladder 110, which may be a conventional bladder or an improved bladder, and a unique outer cover 120. The inner bladder 110 has a generally rectangular shape when empty, and is, in the example of a 40 foot shipping container, approximately 37 feet long and 9½ feet wide. It may consist of a single layer or of several layers. As in conventional flexitanks, the outer cover 120 supports and provides additional strength along the length of the flexitanks that will help absorb and control the internal liquid dynamics during transport, and it also reinforces inner bladder 110, particularly at the ends thereof.

Figure 5:
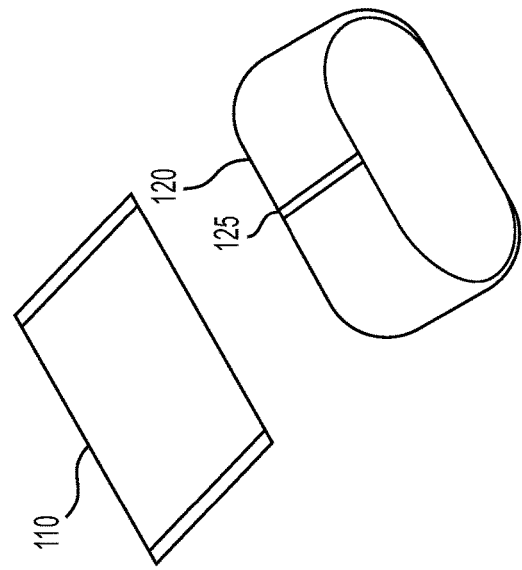
FIG. 5 shows the inner tank 110 and the outer cover sheet being formed into a belt loop according to a preferred embodiment of the invention.
Figure 5:
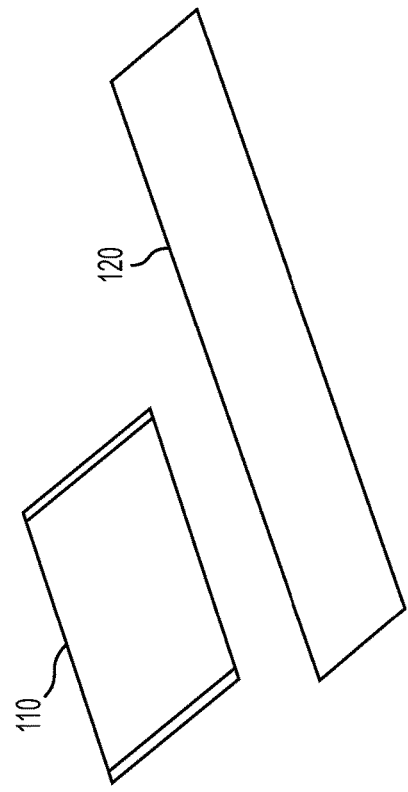
Figure 6:
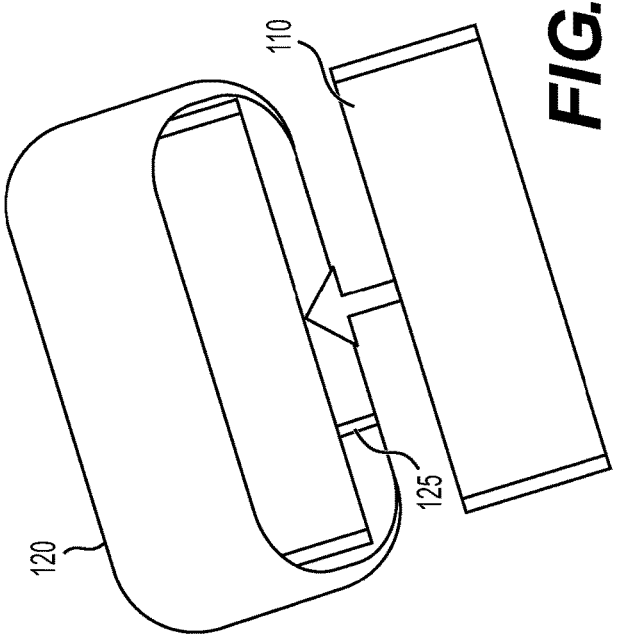
FIG. 6 shows the inner tank 110 being inserted in the outer cover 120 according to the preferred embodiment of the invention.

A main feature of the preferred embodiment is that outer cover 120, and thus flexitank 100, is uniquely manufactured and configured. In the preferred embodiment, the outer cover 120 is not formed into a tube. Furthermore, the material sheet used for outer cover 120 is not close to the length of the inner bladder 110 and is at least twice the length of the inner bladder 110, for example 74 feet. The inner bladder 110 is laid on top of outer cover 120 while it is spread out and measurements are taken of its position and marked. The inner bladder 110 is set aside and ends of outer cover 120 are brought together and joined at a single lateral seam 125. The result resembles a belt shaped loop or "envelope". See FIG. 5. Before the inner layer is put in place, the outer cover 120 is turned over so that the lateral seam 125 is on the bottom. The inner bladder 110 is moved into place from the side rather than from an end and positioned on the marks. Consequently, it only moves a small distance (about 10 feet) in the preferred embodiment of the invention compared to movement from the end in the conventional flexitank (about 40 feet). See FIG. 6. A reinforced opening is made at the appropriate location in the top of outer cover 120 for the valve to be positioned and secured in place with a clamp or other suitable mechanism. The top and bottom portions of outer cover 120 are then joined to each other by two longitudinal seams 130 on the sides. See FIG. 7.

Figure 1:
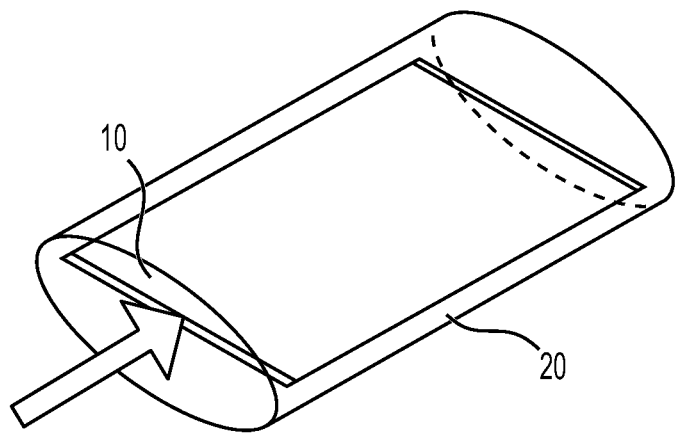
FIGS. 1-3 show a prior art method of assembling a flexible tank.
Figure 2:
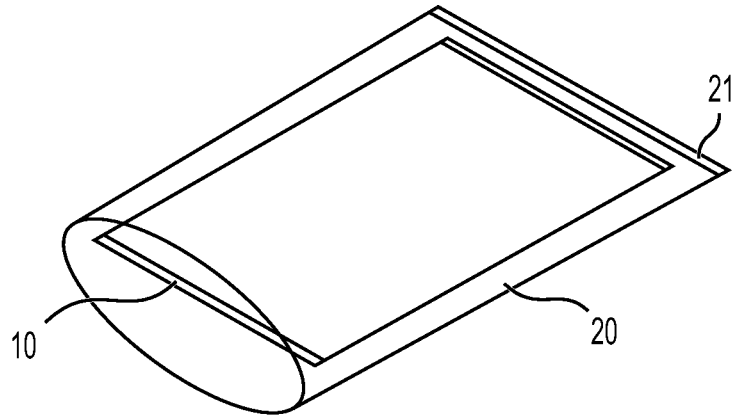
Figure 3:
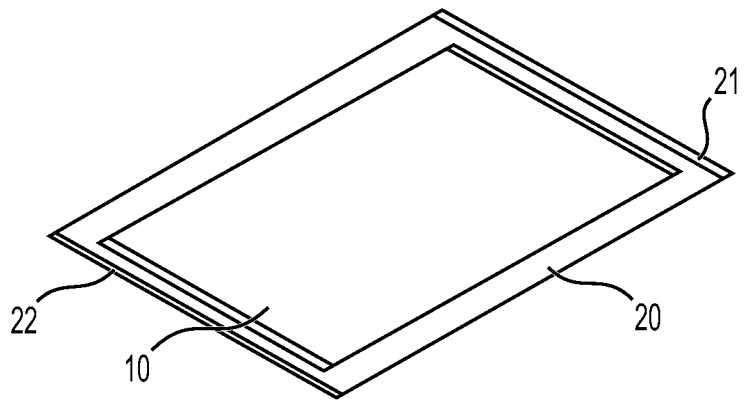
Figure 4A:
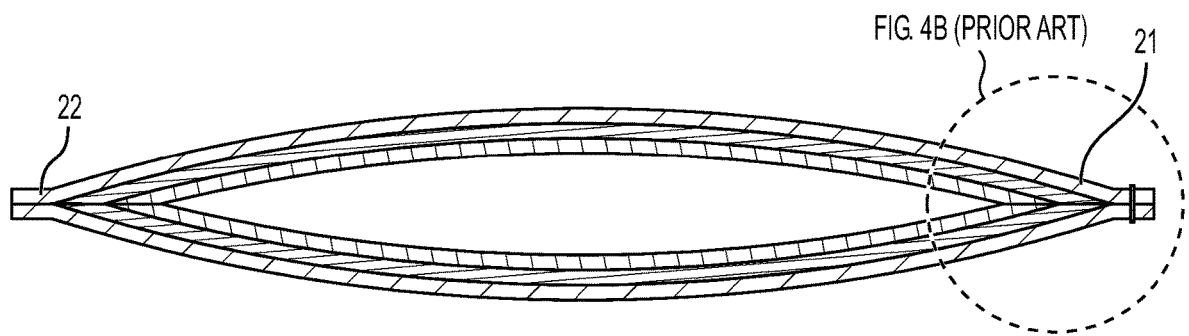
FIGS. 4(a) and 4(b) illustrate the end seam of a prior art flexible tank.
Figure 4B:
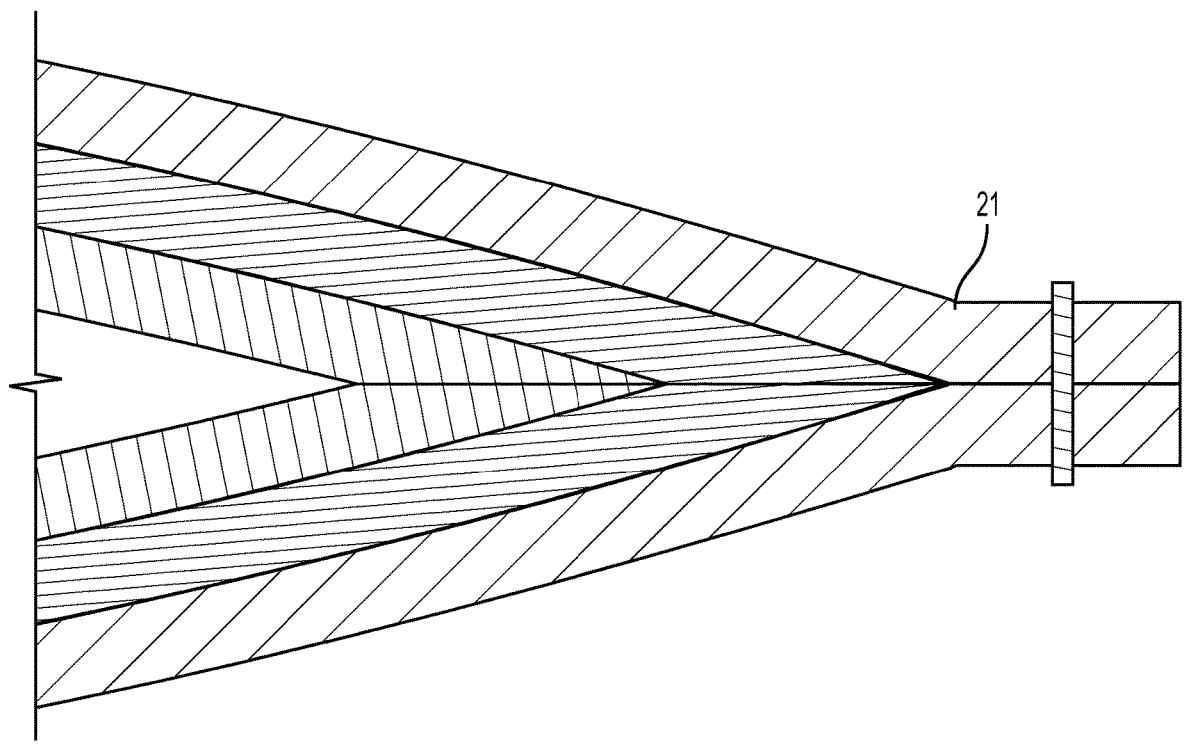
Figure 7:
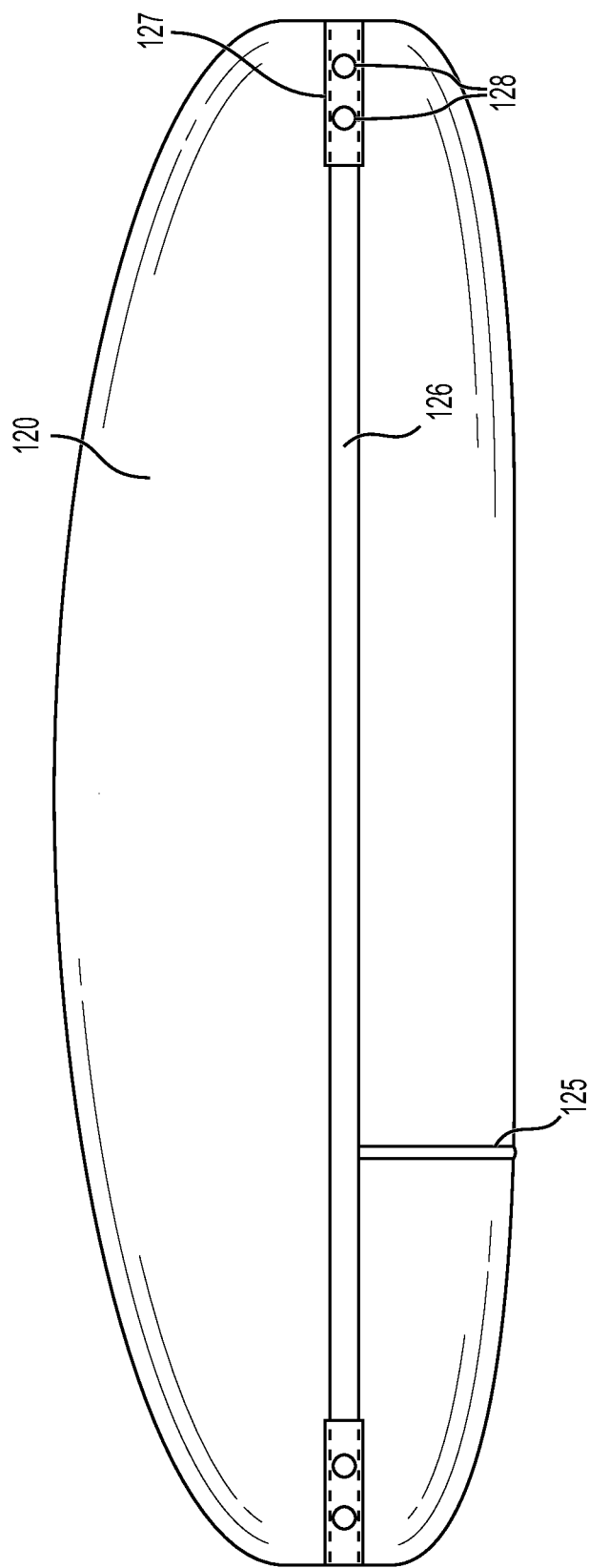
FIG. 7 shows a side view of the outer cover 120 after enclosing the inner tank therein according to the preferred embodiment of the invention.

Lateral seam 125 is preferably a welded "overlap" joint cross seam. When the outer cover 120 material is as specified, the overlap is preferably about 2 inches. The longitudinal side seams 126 are not the prior art seams shown in FIGS. 4(a) and 4(b). They are preferably overlapped "prayer" joints where the material is folded over and back again and welded in place. Other types of seams may also be used for side seams 130. FIG. 7 shows the longitudinal side seams larger than they actually are for emphasis. Preferably, only 2 to 3 inches of material are used for the seam.

When the preferred embodiment is constructed, the outer cover 120 does not have two end seams. Instead, there is only one lateral seam 125 on the bottom (not located at either end), and two longitudinal seams 126. The lateral seam 125 is supported by the floor of the container and is not significantly stressed by the movement of liquid like the end seams. Preferably, the lateral seam 125 is preferably located 16-18 feet from the rear of the flexitank and the valve is approximately 33 inches from the rear of the flexitank and, consequently, near the rear open end of the container. Even when the end seams of a conventional flexitank are reinforced or strengthened, the preferred embodiment has advantages because the seams are not located at the point of the greatest amount of stress. Prior attempts to improve flexitanks have focused on strengthening the end seams. The preferred embodiments contain a more radical improvement by rethinking the manufacture of the flexitank so as to eliminate the end seams and to do so in a manner that does not introduce other undesirable effects. The preferred embodiments are also have the additional benefit that less fabric is used for the outer cover 120.

Unlike a conventional flexitank, the seams 125 and 126 in the outer cover 120 in the preferred embodiments cause the outer layer to be air tight. In addition to the above construction, the end portions of each one of the two side longitudinal seams 126 may be reinforced such as with a heavy duty fabric tape 127 and air vent holes 128 punched therethrough. There may be one, two, or three holes 128 on each side. The holes 128 are not as large as they may appear in FIG. 7 and, for example, may be ⅝ inch diameter circles. Although the reinforcing tape 127 and holes can be placed elsewhere, it is preferred that the holes 128 are punched out at the side seams 126 since the side seams 126 are thicker than the rest of the outer cover 120 and help to prevent tearing of the holes 128 causing them to become larger. The air vent holes 128 and reinforcing tape 127 are preferably located near, for example, approximately 1 foot from, the front and/or rear of the flexitank. The air vent holes 128 help to equalize air pressure within outer cover 120 as the liquid in the flexitank shifts back and forth and also allows the flexitank to be folded and rolled into a highly compressed form so that it has a small volume while it is transported prior to use.

In the preferred embodiment, cover 120 is made from a single sheet of material rather than two pieces sewn together at the ends. Moreover, the outer cover 120 is not formed into a tube shape and does not have any end seams. The flexitank is shorter than the internal length of the shipping container and its ends fall short of the end walls of the container.

The cover 120 for the flexitank is preferably constructed from layers of a 610 gram per square meter vinyl fabric on a base reinforcing scrim of either a 14×14 or 20×20 per centimeter polyester thread. Such a relatively high thread count of the scrim provides added strength for the carriage of liquids with a specific gravity higher than water. The diameter of the cover is customized when the flexitank is used in a 40 foot container depending on the amount and viscosity of the liquid material.

As mentioned previously, the primary function of the inner bladder 110 is to keep intact the liquid contents therein. Specifically, the inner bladder 110 is made of a material that will not chemically interact with the liquid. Moreover, the inner bladder 110 will not physically interact with the liquid, such as by shedding particles of itself into the liquid, or leaching chemical components of the inner bladder 110 into the liquid. It is essential that the inner bladder 110 does not in any way compromise the liquid, as that would ruin or diminish the value of the liquid.

It is the primary function of the outer cover 120 to offer physical reinforcement and protection to the inner bladder 110 and the entire flexitank, and thus protect the liquid during shipment in a 40 foot container. As described herein, the construction and selection of durable and flexible materials that comprise the outer cover 120 is important to this function. In one preferred embodiment, the outer cover 120 is constructed of a polymeric material or PVC plastic.

In a particular embodiment for a 40 foot shipping container with no bulkhead, the outer cover 120 is preferably constructed of a PVC plastic that has incorporated within it a flexible woven scrim 121 comprised of a polymeric material so that outer cover 120 has sufficient strength and flexibility to safely contain the liquid contents during all phases of transport without introducing any other unnecessary disadvantages. The scrim 121 is made of polymeric, polyester or nylon fibers densely woven in a manner, such as an orthogonal criss-cross pattern, to maintain its integrity during production of outer cover 120 and use in a flexitank. The weave of fibers creates a corresponding pattern of holes between the fibers, and the weave of fibers and holes being important aspects of the preferred embodiments of outer cover 120.

Figure 8:
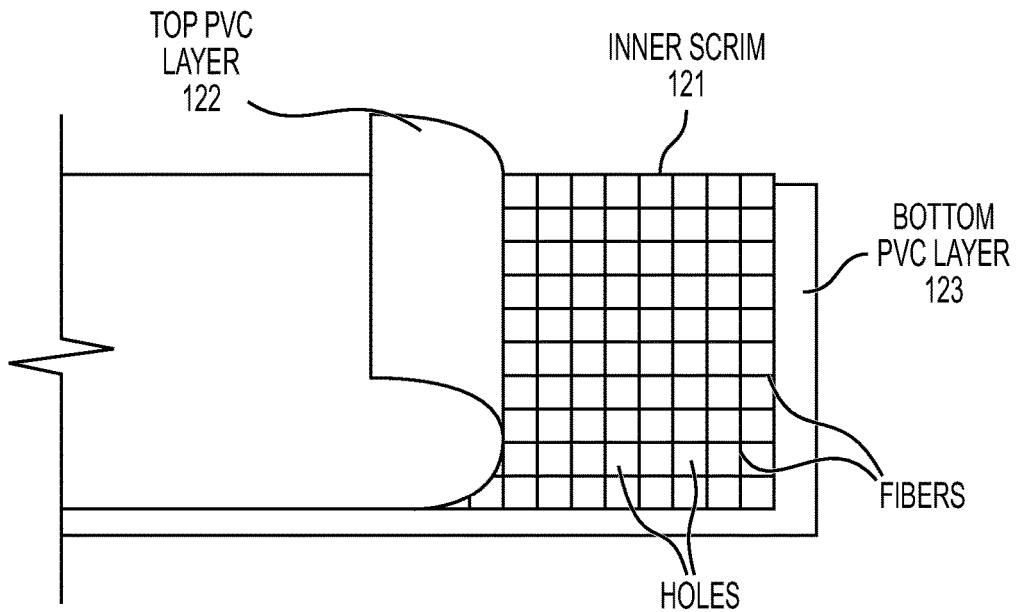
FIG. 8 shows the arrangement of the inner scrim and PVC layers in the material of the outer cover 120 according to a preferred embodiment of the invention.
Figure 9:
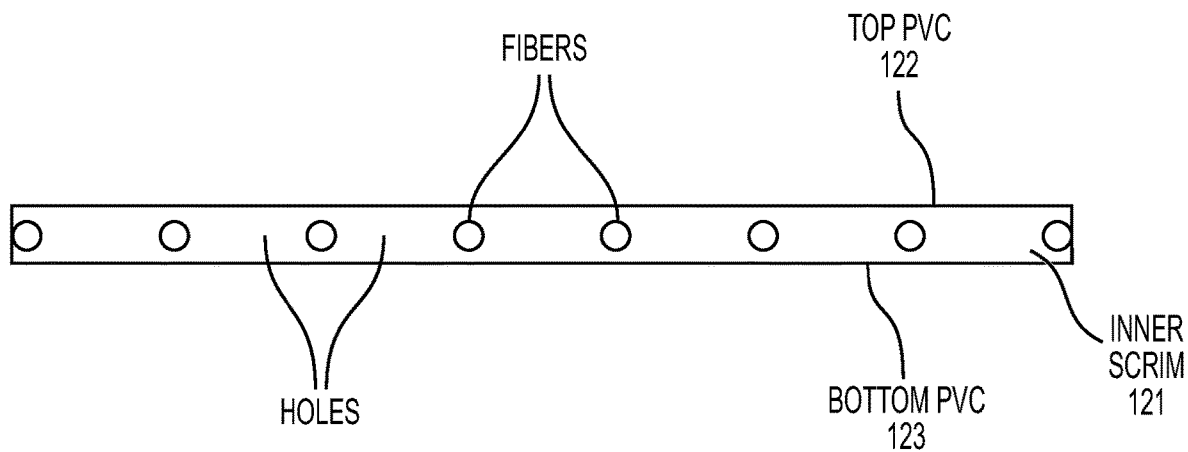
FIG. 9 is a cross-section view of the arrangement in FIG. 8.

There are two alternative methods of coating scrim 121 to produce outer cover 120. In the first method, the scrim 121 is sandwiched by, or placed between, two layers of PVC 122, 123. A layer of PVC 122 is covered by scrim 121, and that is covered by a second layer of PVC 123. See FIGS. 8 and 9. The sandwich of 122-121-123 is then heated and pressed together such that the two PVC layers 122, 123 melt and are forced through the holes in the woven scrim 121, and meld with one another, thereby creating an integral outer cover 120 that is a single piece of melded PVC with an inner core of scrim 121. In the second alternative method, scrim 121 is coated on one side by a layer of molten PVC polymer 122. Once completed, the scrim 121 is turned over and the reverse side is coated with a second layer of molten PVC polymer 123. In either of these alternative methods, a strong yet still light outer cover 120 is created that can handle the physical pressures and protect the flexitank 100.

The weave of fibers and the size of the holes in scrim 121 is an important feature of the preferred embodiments for flexitanks used in 40 foot shipping containers. If the holes of scrim 121 are too small, not enough bonding occurs between the two layers of PVC 122, 123, and the outer cover 120 will lack integrity. If the holes are too large, outer cover 120 will not have sufficient strength to fulfill its protective function or will have a disadvantageous strength-to-weight ratio. In a flexitank having a typical capacity for a 40 foot shipping container, the scrim 121 is preferably woven such that there are between 144 and 289 holes per square inch. This corresponds to a weave pattern that provides between 12 to 17 holes per linear inch, and a pattern of between 12×12 and 17×17 holes per square inch. In a more preferred embodiment, the scrim is woven such that there are between 169 and 225 holes per square inch. This corresponds to a weave pattern that provides between 13 to 15 holes per linear inch, and a pattern of between 13×13 and 15×15 holes per square inch. In a most preferred embodiment, the scrim is woven such that there are 196 holes per square inch. This corresponds to a weave pattern that is 14 holes per linear inch, and a pattern of 14×14 holes per square inch.

While the number of holes per square inch is important, it is also important that the size of the holes be large enough, yet not too large. Preferably, the holes are between 0.0030 square inches per hole and 0.0055 square inches per hole. In a more preferred embodiment, the holes are between 0.0035 and 0.0045 square inches per hole. In an even more preferred embodiment, the holes are between 0.0037 and 0.0040 square inches per hole. Related to this is the portion of the total surface area of the scrim 121 that consists of the woven fibers, and the portion of the total surface area that consists of holes within the woven fibers, and through which the PVC layers 122, 123 can meld together. In a preferred embodiment, the holes within the woven fibers comprise between 65-85% of the total surface area. In a more preferred embodiment, the holes comprise between 70-80% of the total surface area. In an even more preferred embodiment, the holes comprise between 74-78% of the total surface area.

A flexitank having an outer cover 120 according to the preferred embodiments operates much like conventional flexitanks but is superior in several respects. In particular, it is optimized for use in 40 foot shipping containers having no bulkhead. If a flexitank sized for a 40 foot shipping container is produced by simply taking an existing flexitank design for a 20 foot shipping container flexitank and modifying its dimensions to fit the 40 foot shipping container, it will fail due to the increased capacity and increased dynamic forces created when liquid travels 40 feet instead of 20 feet. If the existing flexitank design for a 20 foot shipping container is additionally modified by strengthening the materials, it will be too heavy to be useful for shipping in a 40 foot containers. Flexitanks have to be moved around and manipulated when empty. The flexitanks of the preferred embodiments should be used with other shipping precautions. There may be non-stick floor mats placed under the flexitank to prevent sliding of the flexitank on the floor of the 40 foot shipping container. Also, capacity bands can be used around the flexitank as a simple and modest way of suppressing wave action inside the flexitank. Preferably, there are a plurality of different length capacity bands made available with the flexitank according to the preferred embodiments, a particular one of the capacity bands being chosen and used in a particular shipment according to the volume of liquid in the flexitank and/or the viscosity of the liquid in the flexitank.

The invention claimed is:

1. A flexible tank for transporting a bulk liquid, comprising:
   an inner tank composed of at least one layer of a flexible water-proof material, the inner tank when filled with a liquid to be transported having a shape which is generally rectangular with two ends, two sides, a bottom and a top, the length of each of the two sides being greater than the width of each of the two ends;
   an exterior cover covering the inner tank, the exterior cover comprised of a sheet of flexible polymeric material that has a length greater than twice the length of each of the two sides of the inner tank, the exterior cover including two longitudinal seams positioned along the length of the polymeric material and extending along the two sides of the inner tank and a lateral seam extending between the two sides and offset from each of the two ends of the inner tank such that the lateral seam is positioned between the two ends of the inner tank; and
   a valve configured to fill and discharge the liquid being transported into the inner tank, the valve extending through the at least one material layer of the inner tank and the flexible polymeric material of the exterior cover, wherein the sheet of flexible polymeric material of the exterior cover forms an enclosure enclosing the inner tank, the sheet of flexible polymeric material of the exterior cover having no seams located proximate the two ends of the inner tank.

2. The flexible tank of claim 1, wherein the exterior cover comprises holes extending directly through the two longitudinal seams, the holes being positioned along the two longitudinal seams proximate the ends of the inner tank.

3. The flexible tank of claim 1, wherein the sheet of flexible polymeric material of the exterior cover comprises PVC with an internal scrim core, the internal scrim core being comprised of woven polyester fibers.

4. The flexible tank of claim 3, wherein the flexible tank is approximately 38 feet in length and the internal scrim core is woven such that it comprises a pattern of holes, wherein the pattern has between 169 and 225 holes per square inch.

5. The flexible tank of claim 3, wherein the internal scrim core is woven such that it comprises a pattern of holes, wherein each of the holes have an average size of between 0.0035 and 0.0045 square inches.

6. The flexible tank of claim 3, wherein the internal scrim core is woven such that it comprises a pattern of holes, wherein the holes comprise between 70-80% of the surface area of the internal scrim core.

7. The flexible tank of claim 1, wherein the lateral seam contacts each of the two longitudinal seams.

8. The flexible tank of claim 1, wherein two opposed ends of the outer cover are joined together at only the lateral seam.

9. The flexible tank of claim 1, wherein the outer cover is comprised of a single sheet of the flexible polymeric material.

10. The flexible tank of claim 2, wherein a portion of the longitudinal seams is reinforced with a fabric tape where the holes extend through the longitudinal seams and the holes extend through the fabric tape.

11. The flexible tank of claim 1, wherein the outer cover forms the enclosure via only the two longitudinal seams and the lateral seam.

12. The flexible tank of claim 1, wherein the enclosure formed by the outer cover includes two ends corresponding to the two ends of the inner tank and two sides corresponding to the two sides of the inner tank, and wherein the longitudinal seams extend along the two sides of the enclosure and the lateral seam extends along a bottom surface of the enclosure between the two sides thereof.

13. A flexible tank for transporting a bulk liquid, comprising:
an inner tank including at least one layer of a flexible water-proof material, the inner tank configured to have a shape that is generally rectangular when filled with a liquid, the inner tank having two ends, two sides extending between the two ends, a bottom and a top, a length of the two sides being greater than a width of the two ends;
an exterior cover comprised of a single sheet of a flexible polymeric material and having a length that is at least twice the length of each of the two sides of the inner tank, the exterior cover including two longitudinal seams positioned along the length of the polymeric material and extending along the two sides of the inner tank and a lateral seam extending between the two longitudinal seams, the two longitudinal seams and lateral seam forming the exterior cover into an enclosure that entirely surrounds the inner tank; and
a valve configured to fill and discharge the liquid being transported into the inner tank, the valve extending through the at least one layer of the inner tank and the flexible polymeric material of the exterior cover,
wherein the enclosure defined by the exterior cover includes no seams at the two ends of the inner tank and the lateral seam is positioned between the two ends of the inner tank and directly contacts the two longitudinal seams.

14. The flexible tank of claim 13, wherein two opposed ends of the outer cover are joined together at only the lateral seam to form the enclosure.

15. The flexible tank of claim 13, wherein the outer cover forms the enclosure via only the two longitudinal seams and the lateral seam.

16. The flexible tank of claim 13, wherein the enclosure formed by the outer cover includes two ends corresponding to the two ends of the inner tank and two sides corresponding to the two sides of the inner tank, and
wherein the longitudinal seams extend along the two sides of the enclosure and the lateral seam extends along a bottom surface of the enclosure between the two sides thereof.

* * * * *